UNITED STATES PATENT OFFICE.

JULIUS J. SUCKERT, OF NEW YORK, N. Y.

IMPROVEMENT IN PROCESSES OF UTILIZING THE WASTE PRODUCTS OF BEER.

Specification forming part of Letters Patent No. 184,994, dated December 5, 1876; application filed November 11, 1876.

*To all whom it may concern:*

Be it known that I, JULIUS J. SUCKERT, of New York, in the county of New York and State of New York, have invented certain Improvements in the Process of Utilizing the Waste Products of Beer, &c., of which the following is a specification:

This invention consists in an improved method of utilizing the waste products resulting in mashing beer, ales, and all malt-brewed liquors, as hereinafter explained.

The dregs, consisting of the husks of grain used, with soluble and insoluble bodies therein contained, are fully exhausted with warm water of all soluble constituents. To the aqueous solution so obtained, the deposit which forms under the sieve-bottom of the mashing-tun is added, and to the whole an addition of malt, varying in quantity with that of the starch present, is made.

In certain cases the conversion of starch into dextrine and sugar can be made with dilute acids, care being taken to fully neutralize after the action is completed.

The above mixture is mashed for two hours, at temperatures varying from 80° to 160° Fahrenheit, and then heated to boiling-point, where it is kept an hour longer, after which an addition of Gélien & Co.'s anti-acid fermentine, patented to me May 2, 1876, No. 176,898, is made, in the proportion of one part to twelve hundred of the wort, and the whole let stand for the following day's brewing, when it can be added at any stage of process, as hot piece-water for sparging, &c. Where Gélien & Co.'s patent anti-acid fermentine cannot be added, the mash is kept almost at boiling-point until ready for use.

The extract received from the almost exhausted malt, as in the above process, can also be utilized without the addition of deposit formed under sieve-bottom of mashing-tun.

The deposit forming under sieve-bottom of mashing-tun can also be used alone by heating to boiling-point, adding Gélien & Co.'s patent anti-acid fermentine, which consists of sulphurous acid, ninety-four parts, by weight; salicylic acid, one part; carbonate of lime, four parts, with or without a slight addition of the carbonate of soda, and the oxide of aluminium, and allowing to stand till next brewing, when it is added directly to the mash.

The advantage of this method is, a larger quantity of beer is produced out of the same quantity of malt than by the usual methods, without impairing the quality of beer so made. As a consequence, malt is economized by the utilization of material hitherto wasted.

Having thus described my invention, what I claim is—

The herein-described process of utilizing the products of malt-brewed liquors, or beer, which process consists in treating the dregs with warm water, and adding the deposit which forms under the sieve-bottom of the mash-tun, and the proper quantity of malt to correspond with the amount of starch present, then mashing and heating the mixture, and adding about one twelve-hundredth part of the anti-acid fermentine, substantially as described.

JULIUS J. SUCKERT.

Witnesses:
EDWARD PLACE,
GEORGE GETZ.